April 15, 1969     D. L. HOFFACKER     3,438,652
SNOBBLE TRAILER

Filed Jan. 25, 1967

INVENTOR
DON L. HOFFACKER
BY Hood Gust & Irish
ATTORNEYS

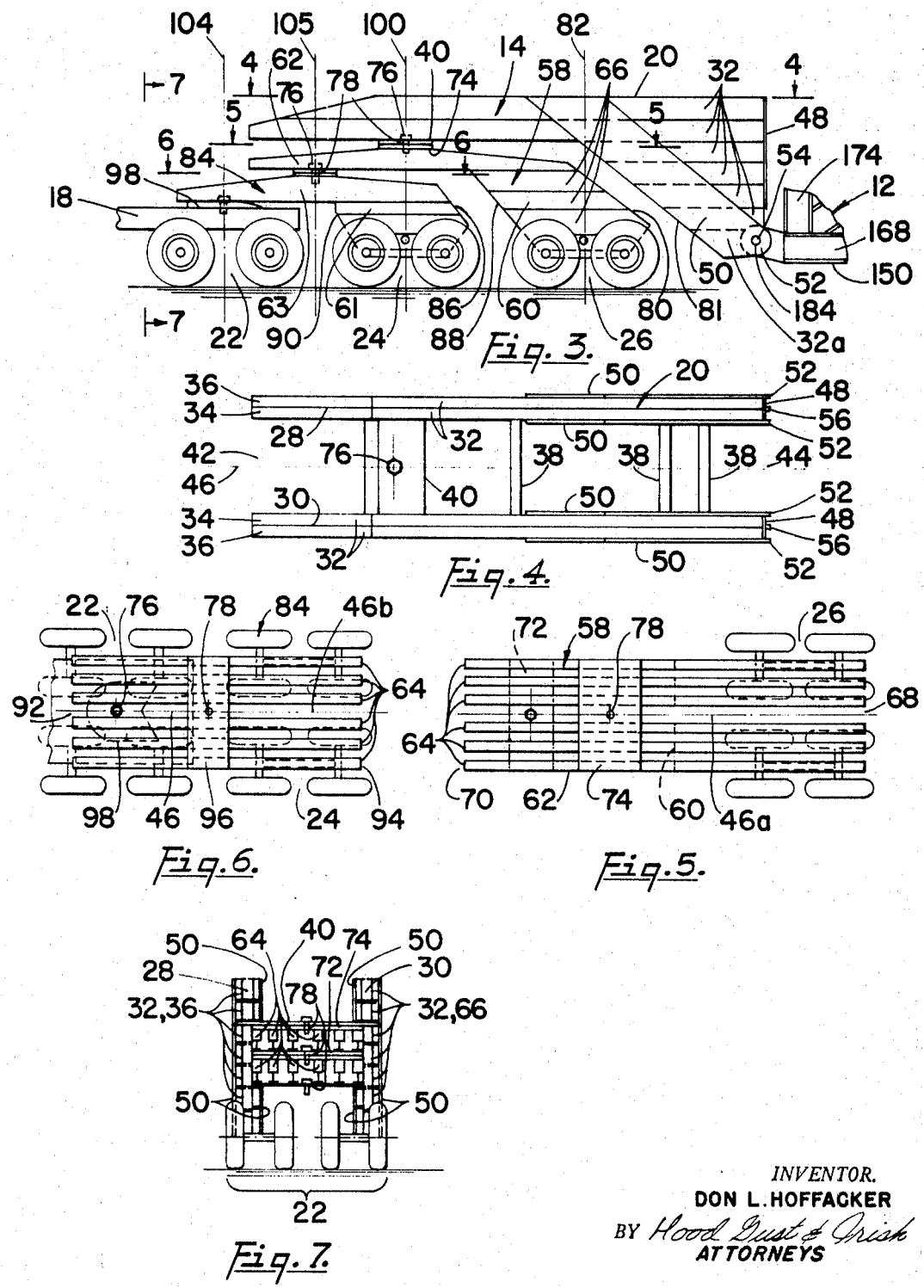

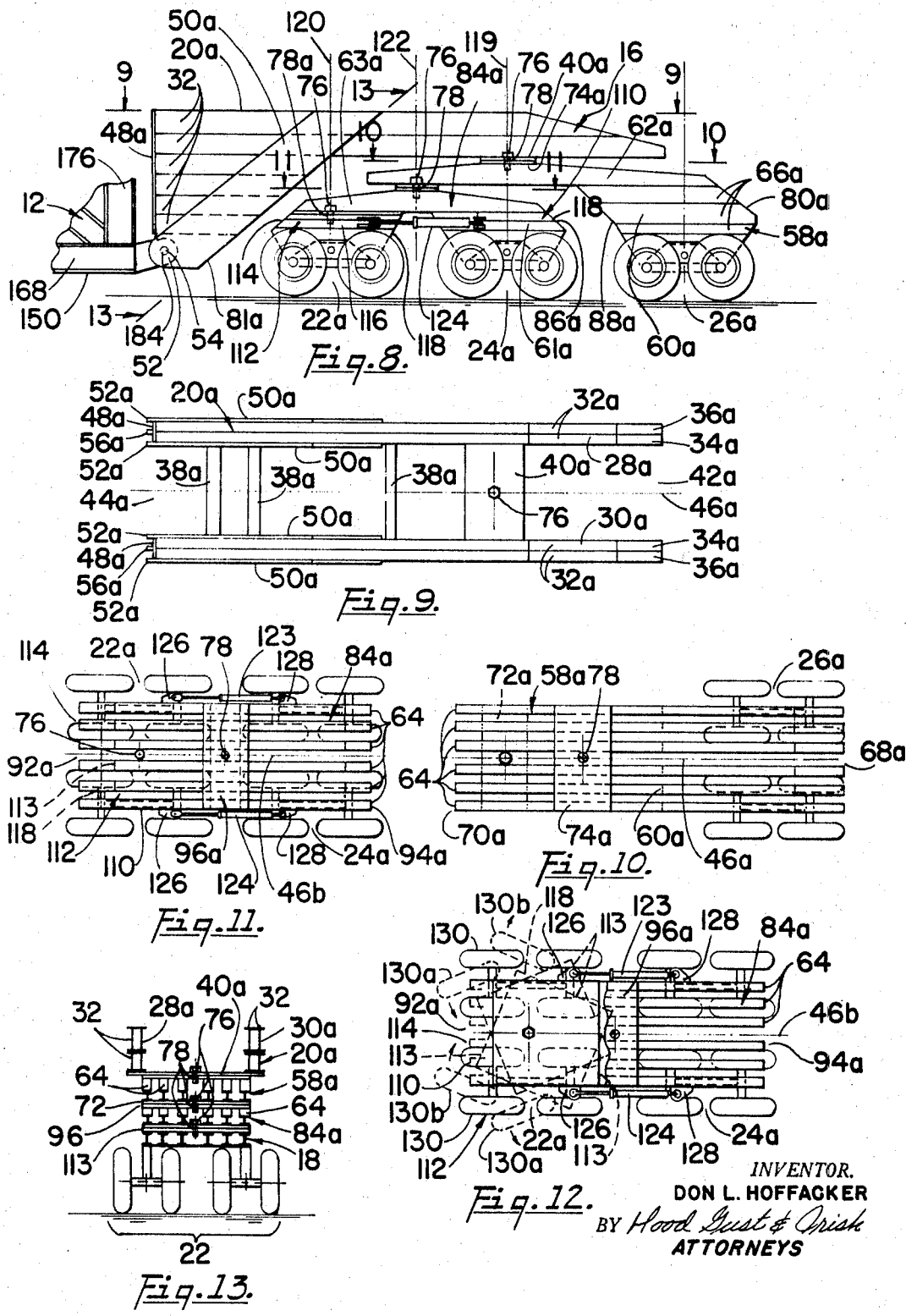

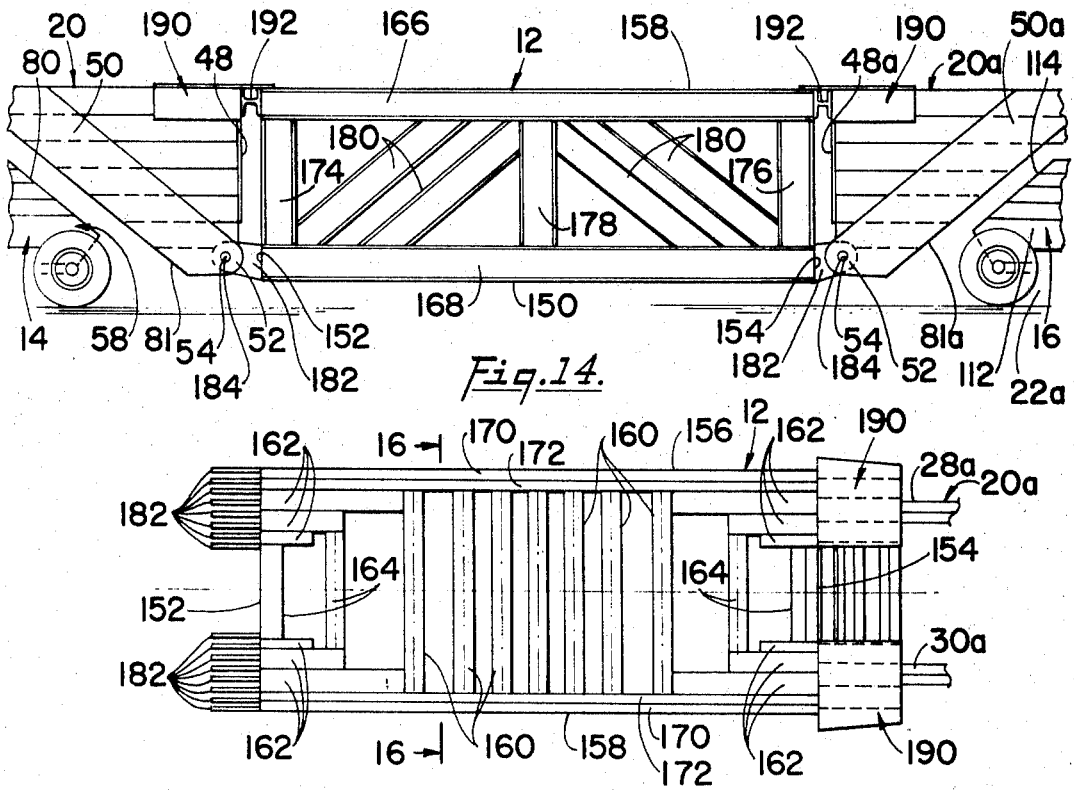
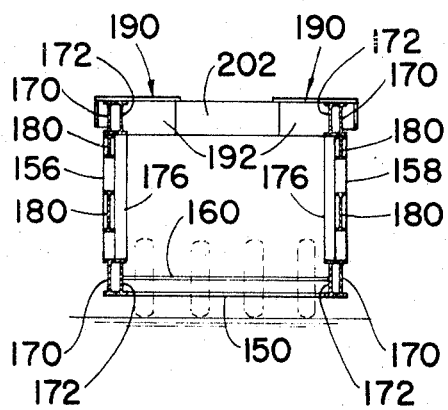

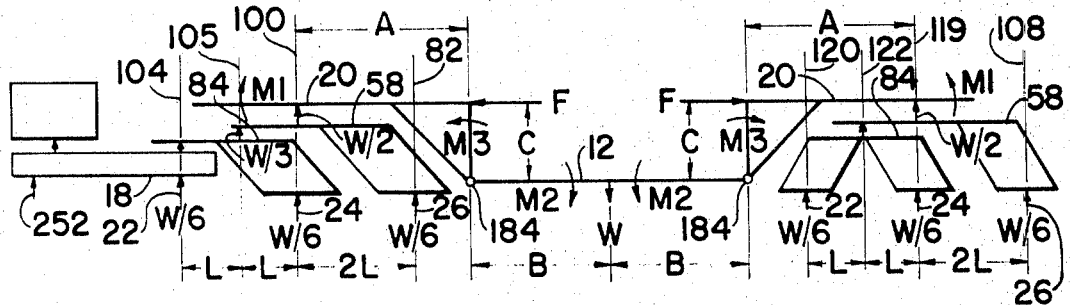
Fig. 21.
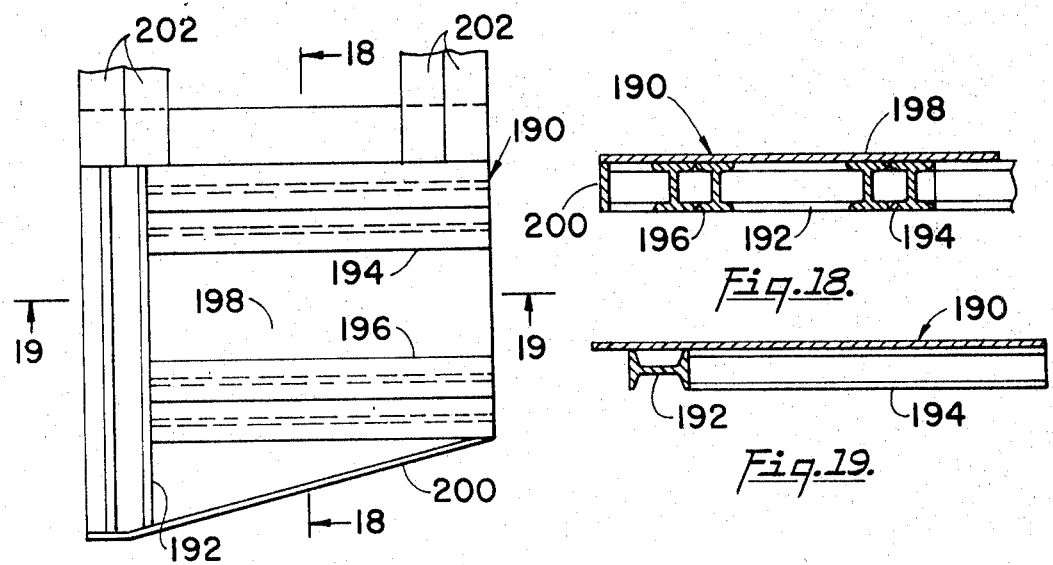
Fig. 18.
Fig. 19.
Fig. 17.
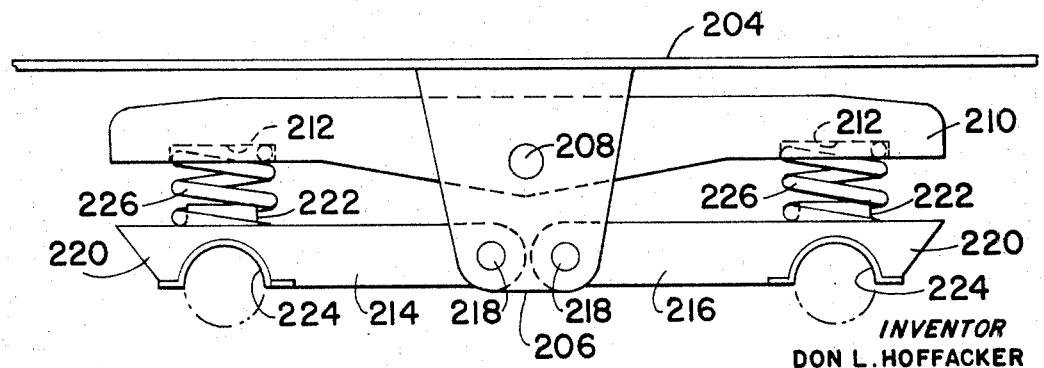
Fig. 20.

United States Patent Office 3,438,652
Patented Apr. 15, 1969

3,438,652
SNOBBLE TRAILER
Don L. Hoffacker, Uniondale, Ind. 46791
Filed Jan. 25, 1967, Ser. No. 611,598
Int. Cl. B62d 53/06; B60d 1/00
U.S. Cl. 280—423
9 Claims

ABSTRACT OF THE DISCLOSURE

A snobble trailer of the low-bed variety which has increased dirigibility and load-bearing capacity. The trailer has a load bed disposed between and pivotally connected by horizontally disposed pins to fore and aft dolly assemblies. The dolly assemblies are swingable about the axes of the pins by the weight of the load so as to urge portions of the assemblies, located directly over the pins, together to hold the structure therebetween in compression.

---

The present invention generally relates to a trailer and more specifically relates to a trailer of the low-bed variety which utilizes the snobble principle in carrying a load and which has good dirigibility.

The term "snobble principle" refers herein to a load-carrying method in accordance with which a load is carried between two supports which are swingably connected to the load. The weight of the load swingably urges the supports together and holds either additional structure or the load itself in compression. By this principle the required non-rigid connections between the supports and the load are relieved of the stress thereby enabling the structure to bear loads larger than the same structure in which the supports are rigidly connected to the load.

Tailers of the low-bed variety are preferably used to haul extremely large and bulky loads. In these trailers, the load-bed is kept as low as possible and the weight is distributed uniformly over a multiplicity of wheels located fore and aft of the load. Such trailers are designed to carry large loads in a manner which meets the existing road and bridge conditions in the various states and cities. In prior designs of such trailers a critical and high stress portion of the trailer is located between the connection of the load bed and the front and rear dolly assemblies. This high stress portion has heretofore been recognized by trailer manufacturers. Prior trailer designs have strengthened and reinforced this portion to provide for heavier loads. However, this high stress portion has limited the load which can be carried by trailers of the conventional low-bed design. Further, the size of the larger of these trailers is such that conventional maneuverability leaves something to be desired. It is therefore desirable to provide a new trailer design having increased dirigibility by which extremely large and heavy loads can be transported.

The principal object of this invention is to provide an improved design of a low-bed trailer utilizing a load-carrying method by which extremely large and heavy loads can be transported.

Another object of this invention is to provide an improved design for a low-bed trailer utilizing the snobble principle by which extremely large and heavy goods can be transported with improved dirigibility.

Yet another object of this invention is to provide an improved trailer design of the low-bed variety in which the load-bed is swingably connected to fore and aft dolly assemblies and in which means is provided, the means in some cases being the load itself, for holding the dolly assemblies apart.

A further object of this invention is to provide an improved trailer design of the low-bed variety which utilizes the snobble principle and in which load beds of various sizes can be substituted between the fore and aft dolly assemblies of the trailer.

In the broader aspects of this invention there is provided a trailer comprising fore and aft dolly assemblies pivotally connected to a load bed. The load bed is positioned between the dolly assemblies and the pivotal connections therebetween have generally horizontal axes. The dolly assemblies are swingable about said axes and have abutment portions positioned generally over and in vertically spaced relation with said axes. The weight of the load bed is sufficient to move the abutment portions of said dolly assemblies toward each other. First means is provided generally over the load-bed for holding the abutment portions of the dolly assemblies apart, and the fore dolly assembly is provided with a second means including a fifth wheel device for adapting the same for connection to a prime mover which can be a conventional truck tractor.

The above-mentioned and other features and objects of this invention and the manner of attaining them will become more apparent and the invention itself will be best understood by reference to the following description of an embodiment of the invention taken in conjunction with the accompanying drawings wherein:

FIGS. 1 and 2, together, are a complete side view of the trailer of this invention;

FIG. 3 is a fragmentary, side view of the fore dolly assembly of the trailer of this invention;

FIG. 4 is a top view of the goose-neck and load transfer member portion of the fore dolly assembly, taken substantially along the line 4—4 of FIG. 3;

FIG. 5 is a top view, taken substantially along the line 5—5 of FIG. 3, of the most rearward wheel suspension of the fore dolly assembly and the tongue portion secured thereto;

FIG. 6 is a top view, taken substantially along the line 6—6 of FIG. 3, of the central wheel suspension of the fore dolly assembly, the tongue portion secured thereto including the fifth wheel device, and a portion of the prime mover;

FIG. 7 is a front view, partially in cross section, of the fore dolly assembly, taken substantially along the line 7—7 of FIG. 3;

FIG. 8 is a fragmentary, side view of the aft dolly assembly of the trailer of this invention;

FIG. 9 is a top view, taken substantially along the line 9—9 of FIG. 8, of the goose-neck and load transfer member portion of the aft dolly assembly;

FIG. 10 is a top view, taken substantially along the line 10—10 of FIG. 8, of the most rearward wheel suspension and the tongue portion secured thereto of the aft dolly assembly of the trailer of this invention;

FIG. 11 is a top view, taken substantially along the line 11—11 of FIG. 8, of the central and most forward wheel suspensions of the aft dolly assembly;

FIG. 12 is a view similar to FIG. 11 showing several of the possible positions between which the most forward wheel suspension of the aft dolly assembly can be moved with respect to the most central wheel suspension of the aft dolly assembly;

FIG. 13 is a front view, taken substantially along the line 13—13 of FIG. 8, of the aft dolly assembly of the trailer of this invention;

FIG. 14 is a fragmentary side view of the central portion of the trailer of this invention including the load bed thereof;

FIG. 15 is a top view of the load bed of the trailer of this invention showing one end thereof disconnected from the adjacent dolly assembly and the other end thereof in connected relation to the dolly assembly;

FIG. 16 is a cross-sectional view of the load bed of the trailer of this invention taken substantially along the section line 16—16 of FIG. 15;

FIG. 17 is a fragmentary and bottom view of one of the compression member assemblies used at both ends of the load bed of the trailer of this invention;

FIG. 18 is a cross-sectional and fragmentary view of the compression member assembly of this invention taken substantially along the section line 18—18 of FIG. 17;

FIG. 19 is a cross-sectional view of the compression member assembly illustrated in FIGS. 17 and 18 taken substantially along the section line 19—19 of FIG. 17;

FIG. 20 is a side view of the wheel suspensions of both the fore and aft dolly assemblies of the trailer of this invention; and FIG. 21 is a schematic force diagram of the trailer of this invention showing the respective locations of the forces, the length of the various lever arms and moment arms, and the force moments of the trailer of this invention.

Figure 1:
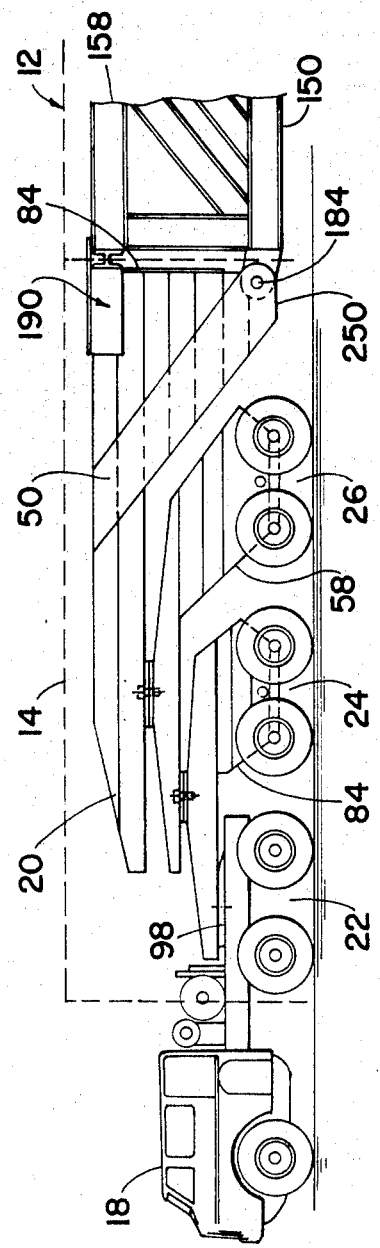
FIG. 1 is a fragmentary side view of the front portion of the trailer of this invention.
Figure 2:
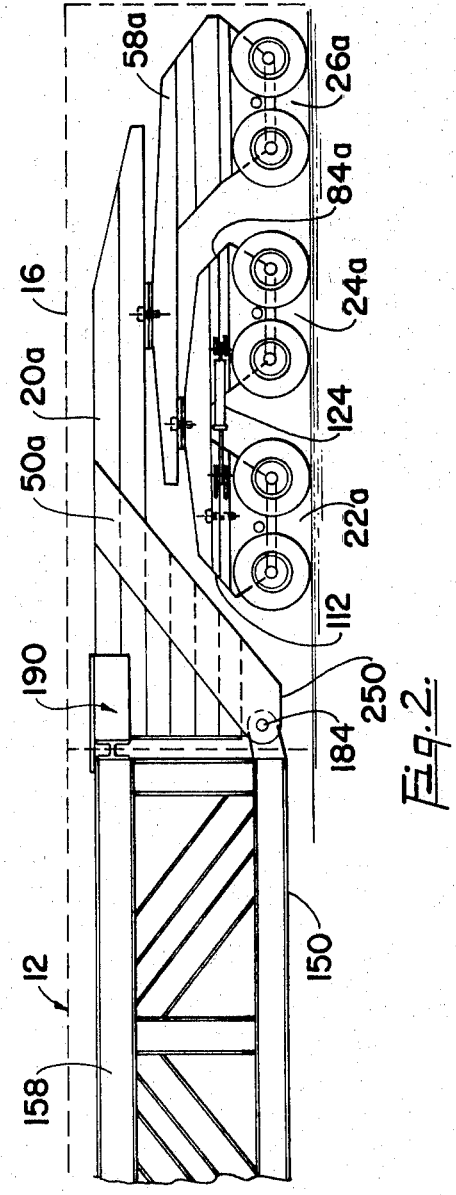
FIG. 2 is a fragmentary side view of the rear portion of the trailer of this invention.

Referring now to the drawings, and more specifically to FIGS. 1 and 2 there is shown the trailer 10 of this invention generally comprising a centrally located load bed 12 and fore and aft dolly assemblies 14 and 16, respectively. The fore dolly assembly 14 is adapted for attachment to a prime mover 18 shown in FIG. 1 to be a conventional truck tractor.

Referring now to FIGS. 3 through 7, the fore dolly assembly 14 will be described in detail. This dolly assembly 14 generally comprises a gooseneck and load transfer member 20 and fore, central and aft wheel suspensions 22, 24 and 26. The wheel suspensions 22, 24 and 26 are identical to each other, and are pivotally inter-connected to each other and to the load transfer member 20.

Referring specifically to the load transfer member 20 of the fore dolly assembly 14, it is shown in FIGS. 3 and 4 to be elongated and to comprise two oppositely disposed goosenecks or members 28, 30 each of which comprises a plurality of beams 32 stacked one on top of the other and in two, side-by-side columns 34, 36 and secured together. The members 28, 30 are disposed in parallel, spaced apart relation. Holding the members 28, 30 in the afore-mentioned spaced-apart and parallel relation are a plurality of beams 38 and a horizontal bearing plate 40. Beams 38 and plate 40 are secured at their opposite ends to the members 28, 30. Thus constructed the load transfer member 20 has opposite ends 42 and 44 and a longitudinal axis 46. Secured to each of the members 28, 30 at end 44 are compression plates 48. Compression plates 48 extend vertically from the top of the members 28, 30 to adjacent the bottom.

Secured to both sides of each of the members 28, 30 are reinforcing elements 50. Each of the reinforcing elements 50 extend diagonally from the bottom of the member 20 at end 44 upwardly to the top of the member 20 at a position spaced apart from end 44 and intermediate the opposite ends 44, 46. The angle at which elements 50 are disposed in a specific embodiment of this invention is 45° with the horizontal. Adjacent to end 44 of the load transfer member 20, each of the elements 50 has an ear portion 52 which has an opening 54 therein. Secured to the bottom beam 32 (given the reference numeral 32a in FIG. 3) is a centrally located ear 56 which is disposed intermediate the two ear portions 52 of the elements 50. Each of the ears 52, 56 have openings 54 therein and each of the openings are in registry with each other such that a pin or rod can be positioned in the openings 54.

Referring now to FIG. 5 there is shown together with FIG. 3 the larger 58 of the two joe dogs of the fore dolly assembly 14. Joe dog 58 generally comprises a wheel suspension 26 secured to a body-like frame portion 60 and an elongated tongue portion 62 secured to the body portion 60 at one end thereof. Tongue portion or member 62 comprises a plurality of beams 64 arranged longitudinally thereof and in a spaced apart relation. Body portion 60 is generally constructed of stacked beams 66 welded together in a manner similar to that above described with relation to the beams 32 and the load transfer member 20. Wheel suspension 26 which like the other wheel suspensions shown in FIGS. 3 through 7 is shown only diagrammatically and without detail. A specific construction of each of the wheel suspensions 22, 24 and 26 will be described hereinafter. However, the wheel suspension 26 comprises two oppositely disposed tandem suspensions which are rigidly secured to the body portion 60 adjacent the opposite sides thereof. As above described, the tongue and body portions 62, 60 have opposite ends 68, 70 and a longitudinal axis 46a. The tongue portion 62 extends beyond the limits of the body portion 60. In this respect, the wheel suspension 26 is secured to the body portion 60 adjacent to the end 68. Adjacent to the end 70 a horizontal plate 72 is secured to the bottom of the tongue portion 62. Intermediate plate 72 and the wheel suspension 26, a horizontal plate 74 is secured to the top of the tongue portion 62. Plate 74 is substantially the same size as plate 40 which is secured to the load transfer member 20 above-described.

Joe dog 58 is pivotally connected to the load transfer member 20. This is achieved by superposing the plates 40 and 74 and positioning a pin 76 in the centrally located openings 78 therein. Thus connected to the load transfer member 20, the suspension 26 is positioned beneath the elements 50 and as close to the end 44 of the load transfer member 20 as possible while still providing adequate clearance between the joe dog 58 and the elements 50 such that the joe dog 58 can pivot about pin 76 without colliding with the elements 50. Aiding this objective is the provision of the trailing edge 80 of the joe dogs 58 in a shape to be generally parallel to the leading edge 81 of the elements 50. Thus positioned, the center of the wheel suspension 26 shown by the line 82 in FIG. 3 is substantially directly beneath the connection of the elements 50 to the top two beams 32 of the members 28, 30.

Referring now to FIG. 6 there is shown together with FIG. 3 the smaller joe dog 84 of the fore dolly assembly 14. This joe dog is similar to the joe dog 58 in the construction of the body-like frame portion 61 and the elongated tongue portion or member 63. The major difference between the joe dogs 58 and 84 is the size and shape of the respective body portions 60, 61 and the tongue portions 62, 63. The trailing edge 86 of the joe dog 84 and the leading edge 88 of the joe dog 58 are angled and shaped generally parallel to each other to provide adequate clearance between the respective joe dogs 58, 84. Joe dog 84 is also elongated and has an axis 46b and opposite ends 92, 94. Wheel suspension 24 is secured to the body portion 61 adjacent to end 94. Wheel suspension 24 is identical in all respects including size to wheel suspension 26. Adjacent to end 92 there is secured to the bottom side of the tongue portion 63 a portion of the fifth wheel device 98. Intermediate wheel device 98 and the suspension 26, a plate 96 is secured to the top side of the tongue portion 63. Joe dog 84 is pivotally connected to the tongue portion 62 of the joe dog 58 adjacent to end 42 thereof by superposing plates 96 and 72 and positioning a pin 76 in the openings 78 thereof. Plates 96 and 72 are substantially the same size and shape.

Joe dog 84, as pivotally connected to the joe dog 58, is positioned such that the wheel suspension 24 is located directly beneath the pivotal connection of the joe dog 58 to the load transfer member 20 as indicated by the line 100 in FIG. 3. Also, the wheel suspension 24 is positioned as close to the end 44 of the load transfer member 20 and the wheel suspension 26 as possible, while still providing adequate clearance between the respective joe dogs 58, 84 such that the joe dog 84 can pivot about the pivotal connection to the joe dog 58 without the trailing edge 86 of joe dog 84 colliding with the leading edge 88 of the joe dog 58.

The rear wheels of the prime mover 18 comprise the wheel suspension 22. The prime mover 18 is pivotally connected to the joe dog 84 adjacent end 92 by means of the fifth wheel device 98 directly over the wheel suspension 22 as indicated by the line 104 of FIG. 3. The wheel suspensions 22 and 24 as indicated by lines 100 and 104 of FIG. 3, respectively are equally spaced apart from the pivotal connection of joe dogs 84 and 58, indicated by line 105 in FIG. 3. Further, the suspensions 22, 26 are equally spaced on opposite sides of the line 100 and the pivotal connection of the joe dog 58 and the load transfer member 20. Thus, each of the wheel suspensions 22, 24 and 26 are equally spaced apart and are symmetrical with respect to the pivotal connection between the joe dog 58 and the load transfer member 20.

Referring to FIG. 7, there is shown a front view of the fore dolly assembly 14 with each of the joe dogs aligned with respect to the load transfer member 20. In this position, each of the longitudinal axes 46, 46a and 46b of the respective joe dogs 58, 84 and the load transfer member 20 are positioned in a common vertical plane one over the other.

Referring now to FIGS. 8 through 13, the aft dolly assembly 16 is shown. The aft dolly assembly 16 comprises a load transfer member 20a and a joe dog 58a which for all intent and purposes of this invention are identical to those above described with reference to the fore dolly assembly 14 having numerals without the suffix a. Consistent throughout this application like reference numerals are applied to like parts.

Referring now to FIGS. 11 and 12 and the appropriate portion of FIG. 8, the leading wheel assembly 110 of the aft dolly assembly 16 is shown to comprise wheel suspensions 22a and 24a. Wheel assembly 110 comprises a joe dog 84a and a steerable dolly section 112. Steerable dolly section 112 has secured thereto the wheel suspension 22a and is pivotally connected to the elongated tongue portion 63a of the joe dog 84a by means of a pin 76 and a pair of plates 113 in substantially the same manner as afore-described. Tongue portion 63a serves as a coupling member to connect the two body-like frames 61, 118 of dolly section 112 and joe dog 84a, respectively. Wheel assembly 110 is pivotally connected to joe dog 58a in a manner which positions wheel suspension 22a as close to elements 50a as possible. The leading edge 114 of the dolly section 112 and the tongue portion 63a of the joe dog 84a are shaped similarly to the trailing edge 80 of the joe dog 58 of the fore dolly assembly 14 so as to provide adequate clearance between the wheel assembly 110 and the elements 50a of the load transfer member 20a. The body portion 116 of the dolly assembly 112 to which the wheel suspension 22a is secured is constructed of beams stacked one above the other and secured together much in the same manner as afore-described with reference to both the load transfer members 20 and the joe dogs 58 and 84. Further, in similarity to the fore dolly assembly 14 hereinabove described, is the positioning of the wheel suspensions 22a, 24a and 26a with respect to their respective pivotal connections. In other words, the wheel suspension 24a is located directly beneath the pivotal connection of the joe dog 58a to the load transfer member 20a as indicated by the line 119 of FIG. 8 and the wheel suspensions 22a and 26a are located on opposite sides of the line 119 and equally spaced therefrom as indicated by the lines 108 and 120 of FIG. 8. Also wheel suspension 22a is located directly beneath the connection of the elements 50a to the top two beams 32 of the load transfer member 20a. Further, wheel suspensions 22a and 24a are located on opposite sides of and at an equal distance from the pivotal connection of the joe dog 84a to the joe dog 58a as indicated by the line 122. Thus, like the fore dolly assembly 14 the aft dolly assembly 16 has each of the wheel suspensions 22a, 24a and 26a equally spaced apart and symmetrical with respect to the pivotal connection of the joe dog 58a and the load transfer member 20a.

The dolly section 112 of the wheel assembly 110 is steerable by means of hydraulic cylinders 123 and 124. The power cylinders 123 and 124 are secured at the opposite ends thereof to the dolly section 112 and the joe dog 84a by ears 126 and 128. Power cylinders 123 and 124 are connected to controls in the cab of the prime mover 18 such that the wheel suspension 22 is movable between the positions 130, 130a and 130b as shown in FIG. 12.

Referring to FIG. 13, there is shown a front view of the dolly assembly 16 which is similar to the view shown in FIG. 7 of the fore dolly assembly 14.

Referring to FIGS. 14, 15 and 16 the load bed 12 is shown to specifically comprise an elongated bottom 150 having opposite ends 152 and 154 and opposite upstanding sides 156 and 158. Sides 156 and 158 are elongated and extend longitudinally of the bottom 150 between the opposite ends 152 and 154. Bottom 150 is defined by a plurality of spaced apart and parallel beams 160 which extend transversely of the bottom 150 and are secured adjacent the opposite ends thereof to the sides 156 and 158. Secured in this manner, sides 156 and 158 extend generally parallel to each other in spaced apart relation. Adjacent to the opposite ends 152, 154 of the bottom 150 there are several beams 162 arranged longitudinally of the bottom 150 which are secured together and to the opposite sides 156, 158 and spaced apart by means 164 which extend generally parallel to the beams 160 but which are shorter to the extent of the width of the beams 162.

Sides 156 and 158 are identical to each other, and thus, a description of one will suffice for each of them. Each of the sides comprises elongated frame members 166 and 168 vertically spaced, each member 166, 168 consisting of two beams 170, 172 secured together in side-by-side relation. Members 166 and 168 are spaced apart and positioned generally parallel to each other by end members 174 and 176 which are similarly constructed out of two beams 170, 172 secured together. The members 166, 168, 174 and 176 are secured together adjacent to the opposite ends thereof, and thereby form a rigid rectangular, box-like structure which has a length equal to the length of the bottom 150. The transversely extneding beams 160 and the longitudinally extending beams 162 of the bottom 150 are secured to the bottom members 168 of each of the sides 156 and 158. The box-like structure above described is reinforced by single members 178 which are disposed generally perpendicularly between the members 166, 168 midway between the ends 152 and 154. Further reinforcement of the sides 156 and 158 is derived from a pair of diagonal beams 180 extending between the members 168, 174 and the members 166, and 178, respectively, on one side, and a pair of diagonal beams 180 extending between the members 168, 176 and the members 166 and 178 on the other. Each of the sides 156 and 158 contain four such diagonal beams 180 and these beams 180 extend diagonally upwardly generally from the ends 152, 154 to the center of the load bed 12. In a specific embodiment, the angle at which the beams 180 are disposed is 45° with the horizontal.

Adjacent to each of the ends 152 and 154 of the bottom 150 are a plurality of ears 182 extending outwardly from the respective ends in opposite directions. These ears 182 are secured to and supported by the members 162 of the bottom 150. Each of the ears 182 have openings 54 therein and are spaced apart from each other such that the ear portions 52 of the elements 50 can be interleaved therein and positioned such that the openings 54 are in registry with each other. A pin 184 is positioned within the openings 54, and by this means, the load bed 12 is connected to the fore and aft dolly assemblies 14, 16. So connected, the dolly assemblies 14, 16 can pivot about the axes of the pins 184 so as to move the facing compression plates 48, 48a thereof together.

The weight of the load bed 12 is sufficient to move the dollies 14, 16 about the axes of pins 184 in a direction to move the facing compression plates 48, 48a of the load transfer members 20, 20a together. Since the members 28, 30 (FIG. 15) of each of the load transfer members 20, 20a are horizontally spaced apart a distance less than the opposite sides 156, 158 of the load bed 12, the members 28, 30, 28a, 30a could, if permitted, be rotated about the axes of the pins 184 into position between the opposite sides 156 and 158. However, such movement would lower the bottom 150 of the load bed 12 to the ground. To prevent this movement, compression member assemblies 190 are provided at each end of the load bed 12.

Referring now to FIGS. 14, 15 and 17 through 19, the compression members 190 are shown to comprise a compression beam 192 which is positioned between the facing compression plates 48 and the opposite ends of the beams 166 (see FIG. 14) of the load bed 12. Compression beams 192 extend transversely of the trailer and both the plates 48 and the opposite ends of the beam 166 of the sides 156, 158 engage the beams 192. Secured to the beams 192 are beams 194 and 196 each of which comprise two beams secured together in side-by-side relation. Beams 194 and 196 extend generally perpendicularly from beam 192 and are parallel to each other and spaced apart a distance which is slightly larger than the thickness of the goosenecks or beams 28, 30 of the load transfer members 20. Further stabilizing the beams 192, 194, 196 in the positional relationships above-described is a top sheet 198 which is secured to each of the beams 192 through 196. Secured to the plate 192 so as to depend therefrom and cover beam 196 from view from the direction viewed in FIGS. 1, 2 and 14 is a side plate portion 200.

As above-described the compression member assembly 190 is positioned at the opposite ends of the load bed 12 so as to position the beam 192 as afore-described and the beams 28, 30 in the space provided between beams 194 and 196. In this position, the beams 194 and 196 are in side-by-side engagement with the beams 28, 30. In the embodiment shown in the drawings, each pair of assemblies 190 which are positioned adjacent to one end of the load bed 12 are joined together by a plurality of beams 202 providing an integral compression-member structure for each of the ends 152, 154 of the load bed 12.

Referring to FIG. 20, the structure of one half of each of the tandem suspensions of each of the wheel suspensions 22, 24, 26, 22a, 24a and 26a is shown. As above-mentioned, each of the wheel suspensions are identical; and thus, a description of one will suffice for a description of all. Each of the suspensions is secured to a suitably strong frame 204. Secured thereto and depending therefrom are a pair of suitably strong hanger devices 206. Positioned between the two hanger devices 206 and pivotally connected thereto by a suitably strong pin assembly 208 is a walking beam 210. Walking beam 210 is in substantial parallelism with the hanger devices 206 and normally located in the horizontal position shown generally parallel to the frame 204. However, the walking beam 210 can pivot about the horizontal axis of the pin 208 so as to swing vertically upwardly and downwardly. Positioned adjacent the opposite ends of the walking beam 210, respectively is a spring retaining recess 212. Each suspension also contains two radius arms 214, 216. These radius arms are suitably strong and rigid and are pivotally mounted by means of rubber bushed assemblies and pin means 218 to the lower portion of the hanger devices 206 beneath the pin 208. Radius arm 216 extends in one direction and is positioned generally beneath the walking beam 210. The radius arm 214 extends in the opposite direction to the radius arm 216 and also is generally beneath the walking beam 210. Both the radius arms 214 and 216 are free to move upwardly and downwardly about the generally horizontal axes of the pin arrangements 218. Each of the radius arms 214 and 216 have adjacent to their distal ends 220 a spring retainer 222.

The spring retainer means 222 of the radius arms 214, 216 is shown in the drawings to be a boss arrangement located directly beneath the recesses 212. Springs 226 extend between the recesses 212 and the bosses 222. The movement of both the walking beam 210 and the radius arms 214, 216 are limited by securing the opposite ends of the springs 226 to the radius arms and walking beam, respectively, such that the spring 226 itself limits the movement of the wheel suspension. Located directly beneath each of the bosses 222 on each of the radius arms 214, 216 is an axle connecting collar 244. The axles of each of the suspensions are secured to the respective radius arms by the collars 224.

In a specific embodiment of this invention, each of the beams afore-described are I-beams and the connection between the respective beams is made by conventional means such as by welding. Also in a specific trailer embodiment designed to carry a load of 600 tons, wheel suspensions 22, 22a, 24, 24a, 26 and 26a are each capable of supporting 100 tons weight, each of the hydraulic cylinders 123, 124 are double acting and capable of exerting 75 tons force; compression plates 48 are 1¼ inch steel plate; and the pins 184 are 8 inches in diameter.

In operation, the trailer of this invention is assembled by jacking up each of the fore and aft dolly assemblies 14, 16 by positioning a jack beneath the elements 50, 50a at the position indicated by reference numeral 250. In this position, the load bed 12 can be inserted between the dollies 14, 16 and the ears 182 interleaved between the ear portions 52, 56 of the load transfer members 20 in a manner such that the openings 54 are each in registry with each other such that the pins 184 can be inserted therein. Obviously, load beds of different lengths could be, in this manner, inserted between the fore and aft dollies 14, 16.

The compression members assemblies 190 are dropped into the position afore-described while the dolly assemblies 14, 16 are still supported by jacks in the position 250. The jacks can then be removed and the trailer of this invention is fully assembled. The assemblies 190 are maintained in position by the force F and the weight of the assemblies.

Referring to FIG. 21 the operation of the trailer of this invention is further described by means of the force diagram illustrated. In this diagram, the weight of the load bed 12 and the load supported thereon is indicated by a force of W magnitude. One half of this weight, $W/2$, is supported by each of the dolly assemblies 14, 16 and each of the wheel suspensions 22, 22a, 24, 24a, 26 and 26a, respectively connected thereto supports ⅓ of the weight supported by its dolly assembly. Thus, each of the forces applied to the trailer by the suspensions have a value of $W/6$. The even distribution of the weight to each of the wheel suspensions 22, 22a, 24, 24a, 26 and 26a is achieved by positioning the wheel suspensions symmetrically about the pivotal connection of the joe dogs 58, 58a to the load transfer members 20, 20a as afore-described.

Specifically, to achieve this result, the distance between lines 82 and 100 in the fore dolly assembly 14 is twice the distance between the lines 100 and 105 and the distance between lines 108 and 119 in the aft dolly assembly 16 is twice the distance between the lines 119 and 122 in the aft dolly assembly. Also, the lines 104 and 105 of the fore dolly assembly 14 and the lines 120 and 122 of the aft dolly assembly 16 are spaced apart one half the distance between lines 82, 100 and 108, 119. By this arrangement, the wheel suspensions 22 and 24 support ⅓ of the load, $W/3$, as indicated on FIG. 21.

The leading wheels 252 of the prime mover 18 supports most of the weight of the engine, cab and associated structure of the prime mover 18. Since the suspension 22 of the fore dolly assembly supports some of this, the indication that the wheel suspension 22 supports ⅙ of the weight of the load, $W/6$, does not indicate the total weight borne by the wheel suspension 22 of the fore dolly assembly 14. Similarly, each of the weight indications of FIG. 21 only refer to the load, W. The weight of the trailer itself is not included in these weight indications.

Now referring specifically to the load bed 12 and the fore and aft transfer members 20, 20a it is shown that the weight of the load bed and the load borne thereby can be represented by a force W applied intermediate between the pins 184. This weight, W, is supported by each of the fore and aft dolly assemblies 14, 16 represented by the forces $W/2$ applied to the load transfer members 20, 20a at a position horizontally spaced from the pins 184 a distance A as indicated in FIG. 21. Thus, each load transfer member 20, 20a is subjected to a moment, $M_1$, the magnitude of which can be represented by:

$$M_1 = WA/2$$

Each of the load transfer members 20, 20a must have sufficient strength to resist this bending moment without appreciable deflection. The strength required in each of the load transfer members 20, 20a can be minimized by positioning the pivotal connection of the joe dogs 58, 58a to the load transfer members 20, 20a (and thus positioning the application of the force $W_2$) as close to the pins 184 thereby minimizing the length of the moment arm A. The desirability of positioning each of the wheel suspensions as close to the load bed 12 has been hereinabove mentioned.

The load bed 12 also has a moment applied thereto. This moment, $M_2$, can be represented by:

$$M_2 = WB$$

It is noted that both the moments $M_1$ and $M_2$ act in the same direction about the pins 184. It is the summation of these moments in a conventional low-bed trailer about the rigid connection between the load bed and the fore and aft dolly assemblies which produces the high stress portion above-mentioned.

These moments, however, in the trailer of this invention, are not additive because the load bed 12 and the dolly assemblies 14, 16 are pivotally connected by pins 184. But because of these same pivotal connections, the moments, M and $M_2$, tend to move the dolly assemblies and load bed about the pins 184. However, such movement, which as above-mentioned is undesirable since the result is to lower the load bed to the ground is restrained by the application of a force, F, to the compression plates 48, 48a at a position directly above and spaced apart from the pins 184 at a distance C. Force F applies a moment, $M_3$, about pins 184 having a magnitude of:

$$M_3 = FC$$

The moment $M_3$ acts in the opposite direction as and completely resists, but for friction about pin 184, the moment $M_1$. Thus, for all practical purposes:

$$M_1 = M_3$$

For this reason, the structure of the load transfer members 20, and specifically, the connection between load transfer members 20 and the load bed 12 of the trailer of this invention need not resist any of the moments $M_1$, $M_2$ or $M_3$.

Further, by applying the forces F to the load transfer members 20 where indicated, the load bed 12 will be reinforced so as to more ably resist the moments, $M_2$. For examples, when the load bed 12 is empty, the sides 156, 158 apply the force F, through the beams 192, to the load transfer members 20. When the load bed 12 is loaded, either the load bed is designed such that the load bed has the same length as the load itself and the forces F are applied by the load itself in combination with the sides 156 and 158, or the load is positioned on the load bed 12 and supplemental members (not shown) of the same length as the load bed 12 are positioned between the beams 192 to apply the force F to the load transfer members 20. In all three cases the sides 156, 158 and the load or the supplemental members will be in compression. This application of the force F to the load transfer members 20 applies a force to the beams 168 in a direction opposite to the force component of the load, W. Thus, the application of the force, F, allows the load bed 12 to carry loads which have weights which are larger than the loads which could be carried by the same load bed in a conventional low-bed trailer structure.

Each of the respective tongue portions 62, 63 of the joe dogs 58 and 84 also have a moment (not shown in FIG. 21) applied thereto at the pivotal connections thereof. However, since in each case the forces applied are smaller than the force, $W_2$, and the moment arms are less than the moment arm, A, (both of which pertain to the load transfer members 20, 20a) the moments that are applied to the tongue portions 62, 63 are not critically large and the tongue portions 62, 63 can easily be provided with sufficient strength to bear the same.

Because of the improved design of the trailer of this invention, loads which are substantially heavier and those capable of being transported by conventional low-bed trailers, can be transported by the trailer of this invention. Because heavier loads usually have larger size, the trailer of this invention may be substantially longer than other trailers of the low-bed design. For this reason, and to provide improved dirigibility of the trailer, the steerable dolly section 112 of the aft dolly assembly 16 is provided. By providing controls to operate the hydraulic cylinders 123, 124, both the fore and aft dolly assemblies 14, 16 can be steered thereby providing the trailer of this invention with the desirable maneuverability.

While there have been described above the principles of this invention in connection with specific apparatus, it is to be clearly understood that this description is made only by way of example and not as a limitation to the scope of the invention.

What is claimed is:

1. A trailer comprising: fore and aft dolly assemblies, each of said dolly assemblies having a load trnasfer member and a wheel assembly operatively connected thereto, a load bed having a bottom, said load transfer members respectively being pivotally connected to said bottom, the pivotal connections of said load transfer members and said bed each having a generally horizontal axis, said bed being positioned between said dolly assemblies, said dolly assemblies being swingable about said axes, said load transfer members each having an abutment portion positioned generally above and in spaced relation with said axes, the weight of said load urging said abutment portions toward each other, first means between said abutment portions for holding the same apart, second means including a fifth wheel device operatively connected to said fore dolly assembly for connection to a prime mover, each said load transfer members and said load bed having opposite ends, and each load transfer member being connected at one end to one end of said bed, and one of said wheel assemblies has at least two separate body-like frames each having wheels attached thereto, one of said frames having a tongue portion extending over the other frame, said tongue portion being pivotally connected to both the load transfer member of the respective dolly assembly and said other frame, the connection of said tongue portion to said load transfer member being between said one frame and the connection of said tongue portion to said other frame, both said fore and aft dolly assemblies have a wheel assembly like said one wheel assembly, said load transfer members have respectively upper and lower portions, said load transfer members each having an elongated reinforcing element secured thereto and extending from said lower portion adjacent to said one end upwardly at an angle and being connected to said upper portion at a position intermediate said one end thereof and the connection of said tongue portion to said load transfer member, said one body-like frame of said fore dolly assembly being immediately beneath said position and adjacent to said element thereof, said other body-like frame of said aft dolly assembly being immediately adjacent to said element thereof and immediately beneath the respective said position.

2. The trailer of claim 1 wherein the wheels of said body-like frames of said aft dolly assembly are positioned symmetrically with respect to the connection of said tongue member and load transfer member of said aft dolly assembly, and wherein said second means and the wheels of said body-like frames of said fore dolly assembly are positioned symmetrically with respect to the connection of said tongue member and load transfer member of said fore dolly assembly, whereby each of said wheels and said second means is loaded generally equally.

3. The trailer of claim 2 wherein said bed has opposite sides upstanding from said bottom, said sides having first members therein with opposite ends respectively spaced apart from said abutment portions of said load transfer members, and wherein said first means includes said first members and a plurailty of compression members respectively positioned between said abutment portions and said first member ends, said abutment portions and said first member ends engaging said compression members, respectively, on opposite sides thereof.

4. The trailer of claim 3 wherein each of said load transfer members include a pair of spaced apart and generally parallel gooseneck portions, said abutment portions being ends of said gooseneck portions, and further comprising a plurality of third elongated members, one pair of said third members being secured at one end thereof to each of said compression members, said third members of each of said pairs extending from their respective compression member in parallel relation to and on opposite sides of one of said gooseneck portions, said third members being respectively in side-by-side engagement with said gooseneck portions.

5. The trailer of claim 4 wherein said other body-like frame of said aft dolly assembly has separate fore and aft frame portions to which wheels are attached, and a member coupling said frame portions together, said aft frame portion being secured to said coupling member, said coupling member extending over said fore frame portion, said coupling member being connected to both said fore frame portion and said tongue portion of said one body-like frame of said aft dolly assembly, the connection of said coupling member and tongue portion being between the connection of said fore frame portion and coupling member and said aft frame portion, both said aft frame portion and said one body-like frame being rearward of the respective pivotal connections of said coupling member to said tongue portion and said tongue portion to said load transfer member of said aft dolly assembly, said aft frame portion being rearward of said fore frame portion and said one body-like frame being rearward of said aft and fore frame portions, said aft frame portion being located directly beneath the connection of said tongue portion and load transfer member, said fore frame portion and said one body-like frame being equally spaced on opposite sides of said last-mentioned connection.

6. The trailer of claim 5 wherein said fore frame portion of said other body-like frame of said aft dolly assembly is pivotally connected to said coupling member of said aft frame portion, and further comprising means for selectively moving said fore frame portion with respect to said aft frame portion thereby to steer said aft dolly assembly.

7. The trailer of claim 6 wherein said other body-like frame of said fore dolly assembly has a member secured thereto and extending therefrom, said fifth wheel device being connected to said extending member in spaced apart relation with said other body-like frame, said extending member being pivotally connected to said tongue portion of said one body-like frame of said fore dolly assembly, the pivotal connection of said extending member and tongue portion being between said fifth wheel device and said other body-like frame, both said one and other body-like frames being rearward of the respective pivotal connections of said tongue portion to said load transfer member of said fore dolly assembly and said extending member to said tongue portion, said one body-like frame being rearward of said other body-like frame and said other body-like frame being rearward of said fifth wheel device, said other body-like frame being located directly beneath the pivotal connection of said tongue portion of said one body-like frame and said load transfer member, said fifth wheel device and said one body-like frame being equally spaced on opposite sides of said last-mentioned pivotal connection.

8. The trailer of claim 7 wherein each of said load transfer members have opposite sides and each of said body-like frames and frame portions have separate tandem suspensions including wheels operatively mounted thereto adjacent to each of said opposite load transfer member sides.

9. The trailer of claim 8 wherein each of said load transfer members, said body-like frames and frame portions, and said bed bottom and sides comprise a plurality of I-beams secured together.

References Cited

UNITED STATES PATENTS

| | | |
|---|---|---|
| 1,544,448 | 6/1925 | Griffin. |
| 2,116,412 | 5/1938 | Reid. |
| 2,376,296 | 5/1945 | Walter. |
| 2,772,892 | 12/1956 | Hake et al. _____ 280—2 XR |
| 2,789,714 | 4/1957 | Norris. |
| 2,919,928 | 1/1960 | Hoffer _____ 280—423 X |
| 3,339,942 | 9/1967 | Ratrovich _____ 280—423 |

FOREIGN PATENTS

| | | |
|---|---|---|
| 1,019,234 | 10/1952 | France. |
| 620,378 | 3/1949 | Great Britain. |
| 778,055 | 7/1957 | Great Britain. |
| 562,990 | 5/1957 | Italy. |

LEO FRIAGLIA, *Primary Examiner.*

U.S. Cl. X.R.

280—2, 81